US012645663B2

(12) United States Patent
Murray et al.

(10) Patent No.: US 12,645,663 B2
(45) Date of Patent: Jun. 2, 2026

(54) HOUSEKEEPING WORK MAP FOR A DEDUPLICATION STORAGE SYSTEM

(71) Applicant: HEWLETT PACKARD ENTERPRISE DEVELOPMENT LP, Spring, TX (US)

(72) Inventors: Callum Murray, Bristol (GB); Aman Sahil, Bristol (GB); Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/185,184

(22) Filed: Mar. 16, 2023

(65) Prior Publication Data

US 2024/0311363 A1     Sep. 19, 2024

(51) Int. Cl.
*G06F 15/16* (2006.01)
*G06F 16/22* (2019.01)
*G06F 16/23* (2019.01)

(52) U.S. Cl.
CPC ...... *G06F 16/2365* (2019.01); *G06F 16/2272* (2019.01)

(58) Field of Classification Search
None
See application file for complete search history.

(56) References Cited

U.S. PATENT DOCUMENTS

| | | | |
|---|---|---|---|
| 8,782,368 B2 | 7/2014 | Lillibridge et al. | |
| 9,061,843 B2 | 6/2015 | Torson et al. | |
| 10,365,974 B2 | 7/2019 | Todd et al. | |
| 10,747,739 B1 * | 8/2020 | Muniswamy Reddy | G06F 16/27 |
| 10,884,633 B2 | 1/2021 | Klarakis et al. | |
| 11,113,237 B1 * | 9/2021 | Visvanathan | G06F 16/137 |
| 12,019,620 B2 | 6/2024 | Mayo et al. | |
| 2004/0015469 A1 * | 1/2004 | Beier | G06F 16/22 |
| 2010/0281077 A1 | 11/2010 | Lillibridge et al. | |
| 2018/0373597 A1 * | 12/2018 | Rana | G06F 16/168 |
| 2020/0320040 A1 | 10/2020 | Butt | |
| 2021/0303412 A1 * | 9/2021 | Hempelmann | G06F 16/1734 |
| 2022/0391290 A1 * | 12/2022 | Geckeler | G06F 21/606 |

OTHER PUBLICATIONS

Cordeau, J. F., et al.; "Simulation-Based Optimization for Housekeeping in a Container Transshipment Terminal"; Feb. 4, 2014; 26 pages.
Yu, H., et. al.; "Yard Operations and Management in Automated Container Terminals: A Review"; Mar. 15, 2022; 27 pages.

* cited by examiner

*Primary Examiner* — Alex Gofman
(74) *Attorney, Agent, or Firm* — Trop, Pruner & Hu, P.C.

(57) ABSTRACT

Example implementations relate to deduplication operations in a storage system. An example includes initiating a housekeeping job to delete a backup item stored in a deduplication storage system; identifying a set of container indexes affected by the housekeeping job, the set of container indexes including at least a first container index; in response to a determination that a housekeeping work map includes a first work entry associated with the first container index, determining an ingest count of new data units added to a first container during an ingest of the backup item into the deduplication storage system, the first container associated with the first container index; and adding the determined ingest count to the cumulative counter included in the first work entry associated with the first container index.

20 Claims, 14 Drawing Sheets

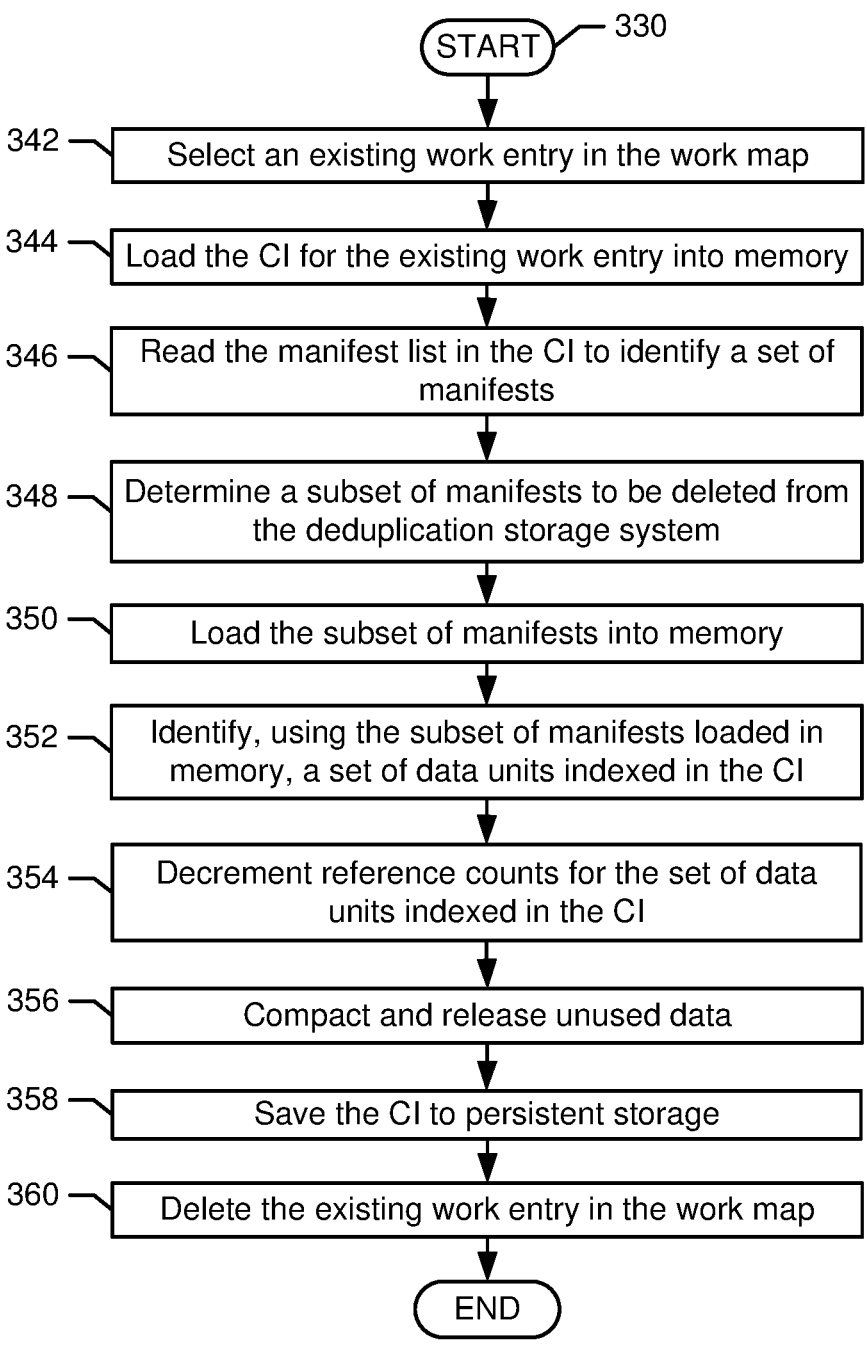

342 Select an existing work entry in the work map

344 Load the CI for the existing work entry into memory

346 Read the manifest list in the CI to identify a set of manifests

348 Determine a subset of manifests to be deleted from the deduplication storage system 350 Load the subset of manifests into memory 352 Identify, using the subset of manifests loaded in memory, a set of data units indexed in the CI 354 Decrement reference counts for the set of data units indexed in the CI 356 Compact and release unused data 358 Save the CI to persistent storage 360 Delete the existing work entry in the work map

FIG. 3B

START — 370

372 — Save the work map to persistent storage

374 — Delete housekeeping job from the job queue

376 — Identify and delete any manifests of the subset that are not needed for processing work entries remaining in the work map 378 — Delete the item metadata for the backup item

END

| Work Map 430 | |
| --- | --- |
| CI | Count |
| | |
| C-3 | 17 |
| C-9 | 3 |
| C-5 | 12 |
| C-4 | 16 |
| C-1 | 11 |

Delete C-2 Entry

Item A Metadata 420

Manifest ID 422

Container List 425

| CI | Ingest Ct. |
| --- | --- |
| C-3 | 8 |
| C-4 | 6 |
| C-1 | 11 |
| C-7 | 12 |

New Entry

| Work Map 430 | |
| --- | --- |
| CI | Cumul. Ct. |
| C-3 | 17 |
| C-9 | 3 |
| C-5 | 12 |
| C-4 | 16 |
| C-1 | 11 |
| C-7 | 12 |

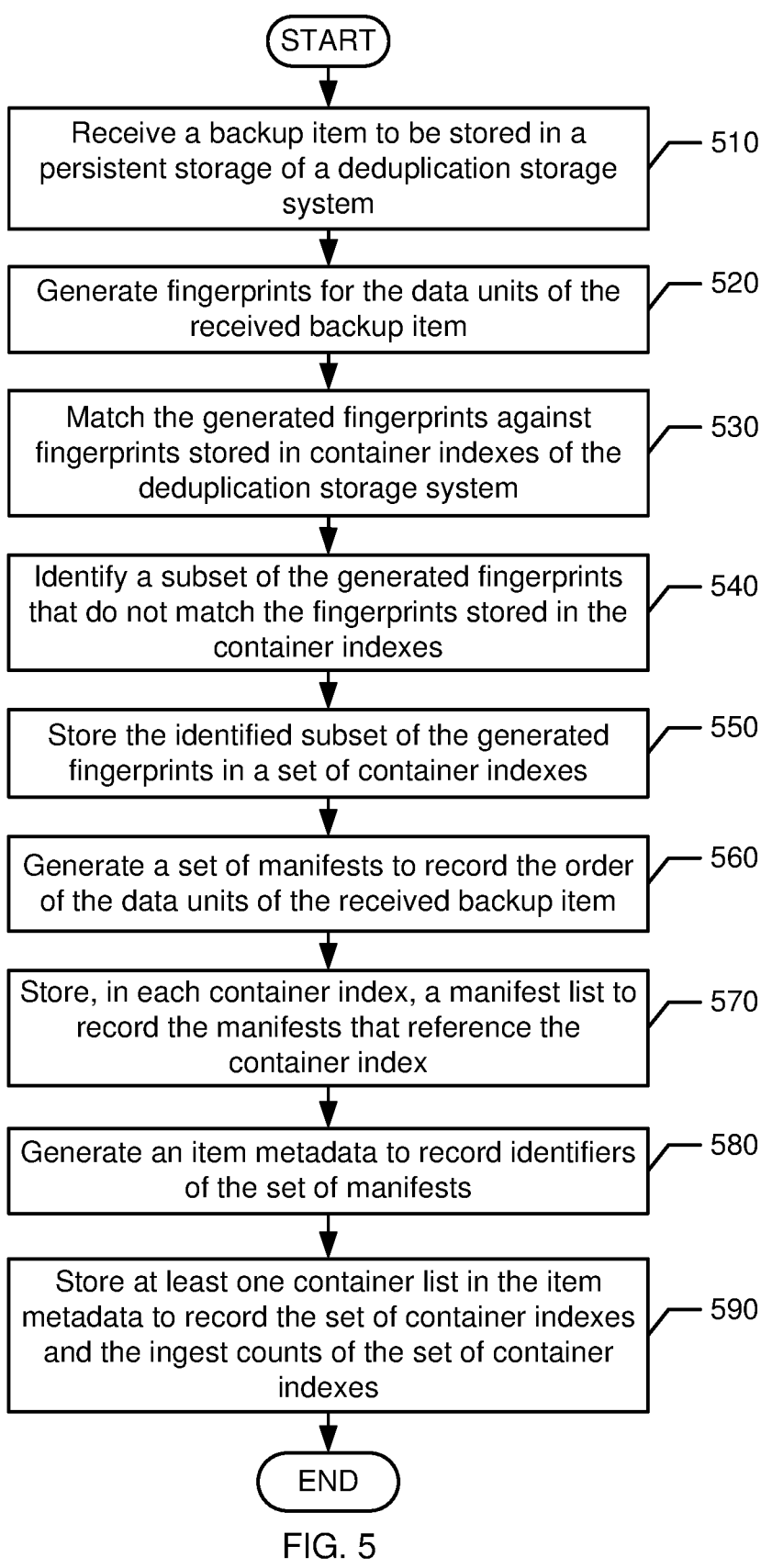

START

Receive a backup item to be stored in a persistent storage of a deduplication storage system — 510

Generate fingerprints for the data units of the received backup item — 520

Match the generated fingerprints against fingerprints stored in container indexes of the deduplication storage system — 530

Identify a subset of the generated fingerprints that do not match the fingerprints stored in the container indexes — 540

Store the identified subset of the generated fingerprints in a set of container indexes — 550

Generate a set of manifests to record the order of the data units of the received backup item — 560

Store, in each container index, a manifest list to record the manifests that reference the container index — 570

Generate an item metadata to record identifiers of the set of manifests — 580

Store at least one container list in the item metadata to record the set of container indexes and the ingest counts of the set of container indexes — 590

END

FIG. 5

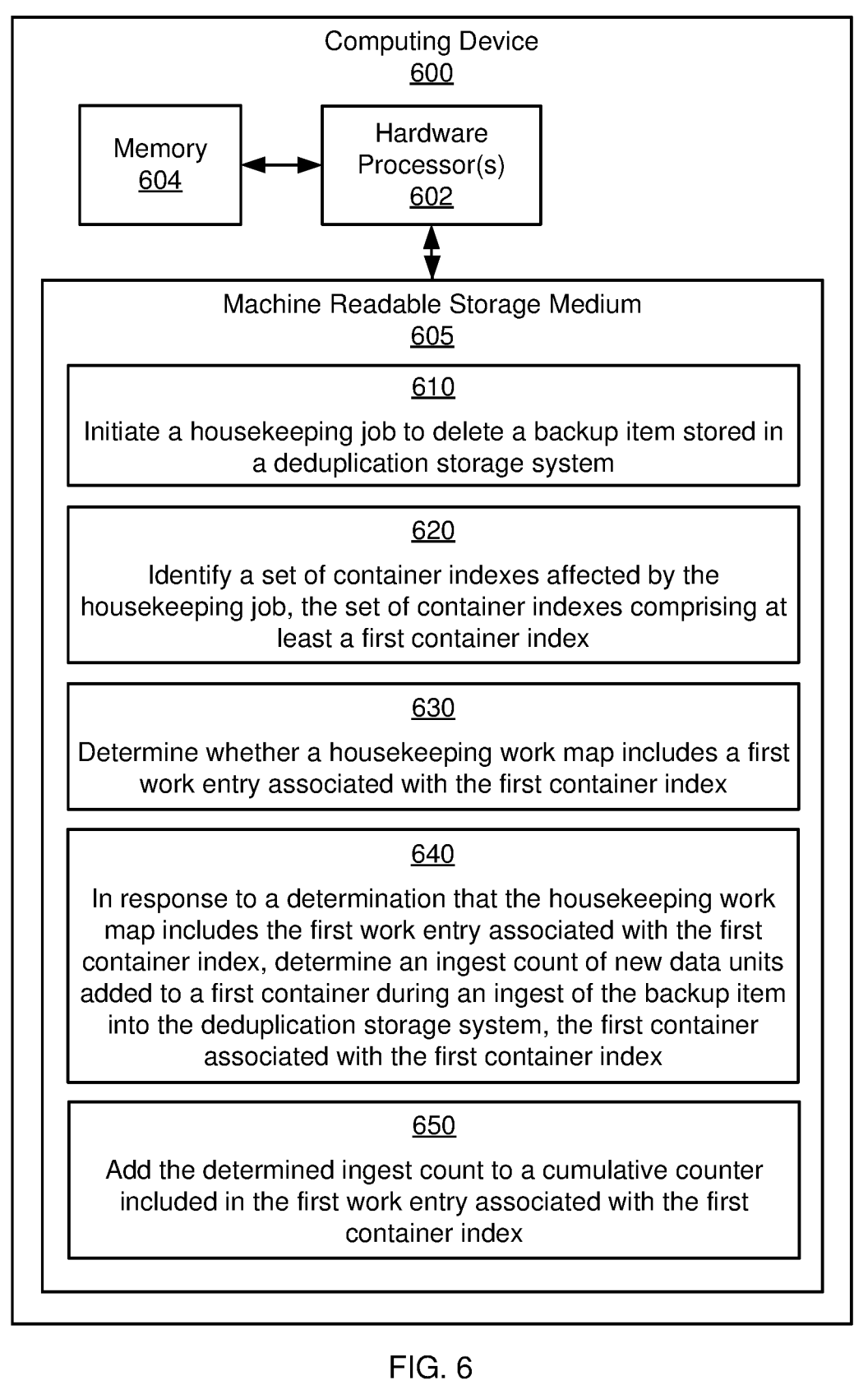

Computing Device
600

Memory
604

Hardware
Processor(s)
602

Machine Readable Storage Medium
605

610

Initiate a housekeeping job to delete a backup item stored in a deduplication storage system

620

Identify a set of container indexes affected by the housekeeping job, the set of container indexes comprising at least a first container index

630

Determine whether a housekeeping work map includes a first work entry associated with the first container index

640

In response to a determination that the housekeeping work map includes the first work entry associated with the first container index, determine an ingest count of new data units added to a first container during an ingest of the backup item into the deduplication storage system, the first container associated with the first container index

650

Add the determined ingest count to a cumulative counter included in the first work entry associated with the first container index

FIG. 6

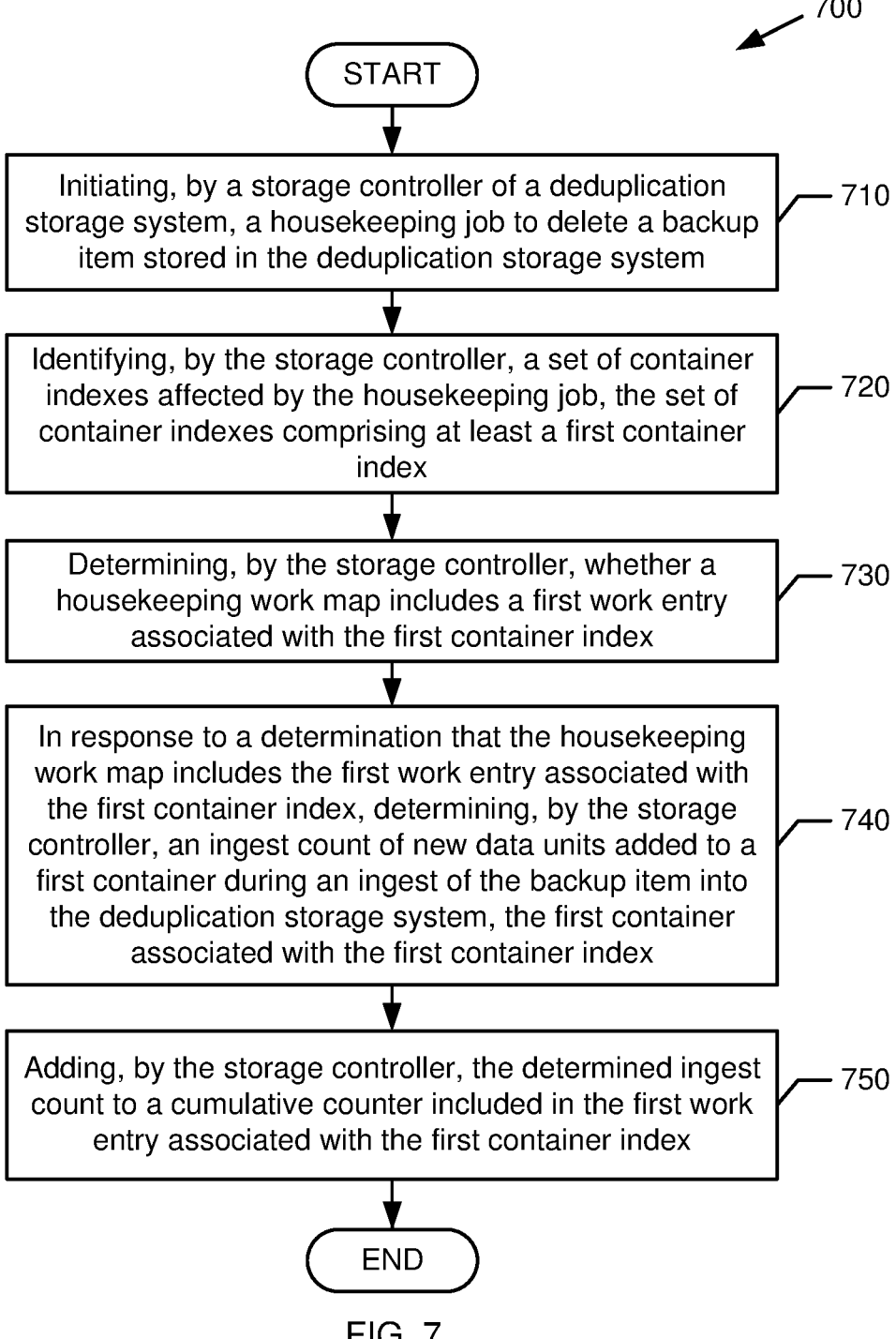

700

START

Initiating, by a storage controller of a deduplication storage system, a housekeeping job to delete a backup item stored in the deduplication storage system
— 710

Identifying, by the storage controller, a set of container indexes affected by the housekeeping job, the set of container indexes comprising at least a first container index
— 720

Determining, by the storage controller, whether a housekeeping work map includes a first work entry associated with the first container index
— 730

In response to a determination that the housekeeping work map includes the first work entry associated with the first container index, determining, by the storage controller, an ingest count of new data units added to a first container during an ingest of the backup item into the deduplication storage system, the first container associated with the first container index
— 740

Adding, by the storage controller, the determined ingest count to a cumulative counter included in the first work entry associated with the first container index
— 750

END

FIG. 7

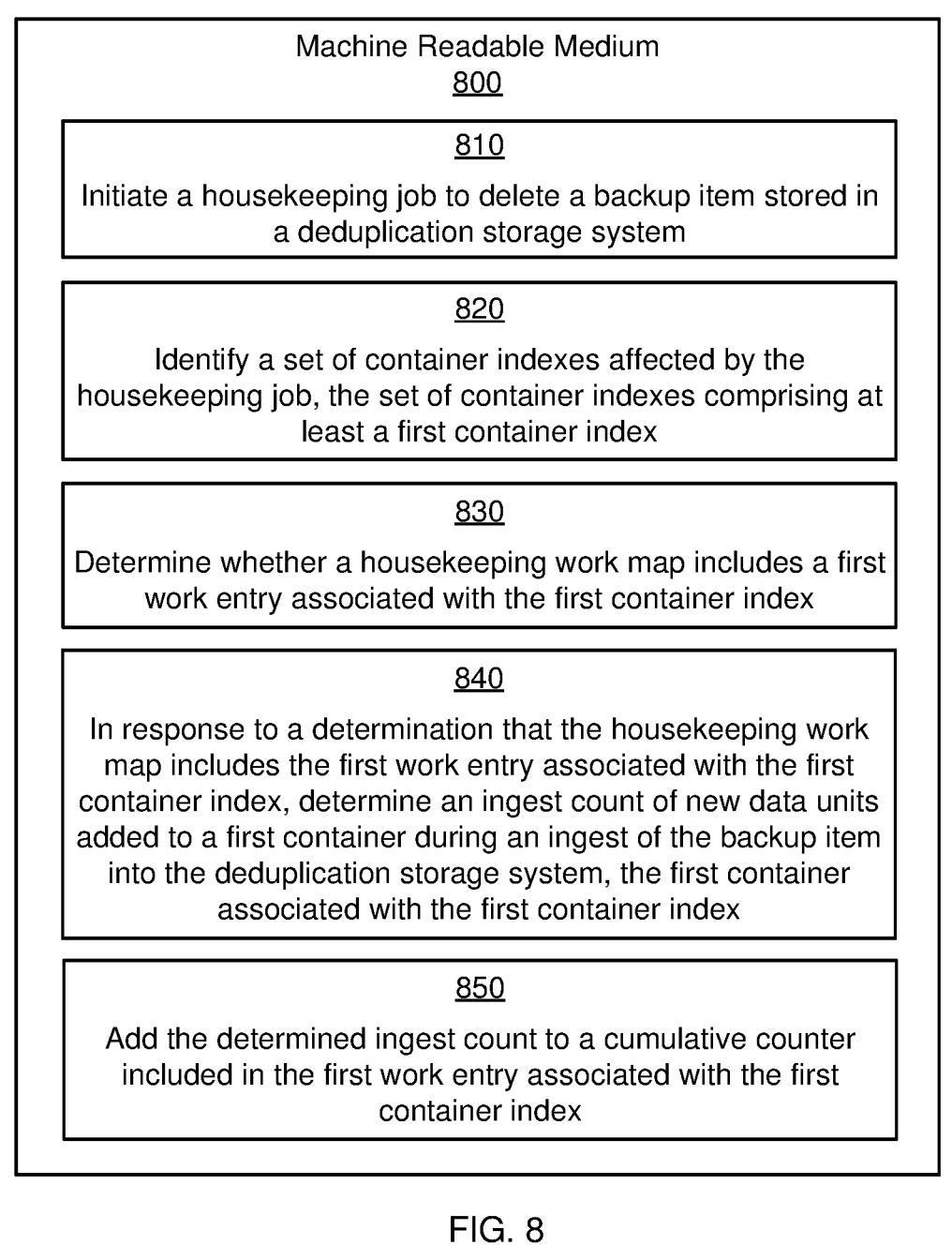

Machine Readable Medium
800

810

Initiate a housekeeping job to delete a backup item stored in a deduplication storage system

820

Identify a set of container indexes affected by the housekeeping job, the set of container indexes comprising at least a first container index

830

Determine whether a housekeeping work map includes a first work entry associated with the first container index

840

In response to a determination that the housekeeping work map includes the first work entry associated with the first container index, determine an ingest count of new data units added to a first container during an ingest of the backup item into the deduplication storage system, the first container associated with the first container index

850

Add the determined ingest count to a cumulative counter included in the first work entry associated with the first container index

FIG. 8

HOUSEKEEPING WORK MAP FOR A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIGS. 3A-3D are illustrations of example processes, in accordance with some implementations.

FIG. 5 is an illustration of an example process, in accordance with some implementations.

FIG. 6 is a schematic diagram of an example computing device, in accordance with some implementations.

FIG. 7 is an illustration of an example process, in accordance with some implementations.

FIG. 8 is a diagram of an example machine-readable medium storing instructions in accordance with some implementations.

Figure 1:
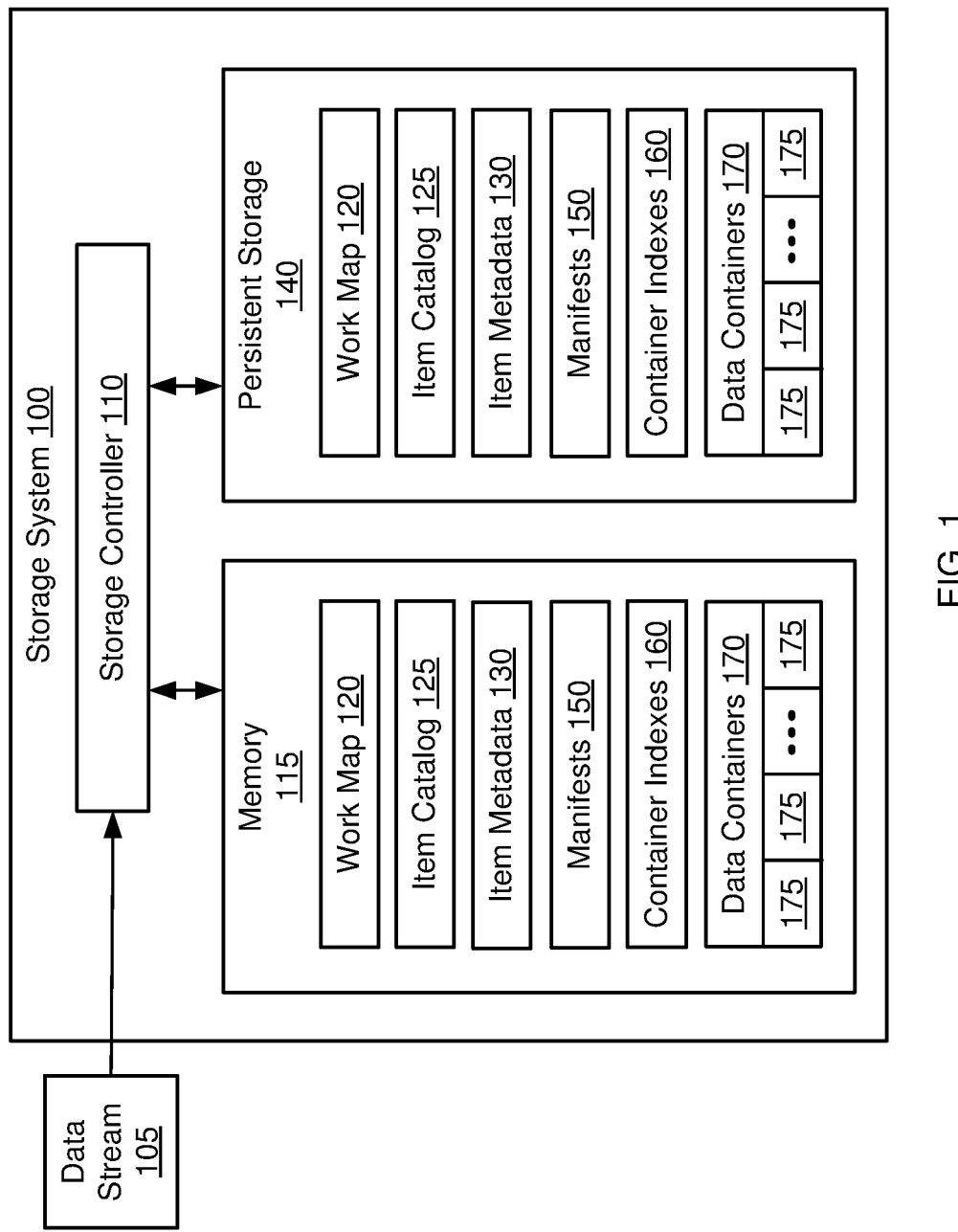
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an." or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream") in deduplicated form, thereby reducing the amount of storage space required to store the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing inbound data streams (e.g., backup items). For example, such metadata may include data recipes (also referred to herein as "manifests") that specify the order in which particular data units are received for each backup item. Further, such metadata may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the deduplication system may use the item metadata and the set of manifests to determine the received order of data units, and may thereby recreate the original data stream of the backup item. Accordingly, the set of manifests may be a representation of the original backup item. The manifests may include a sequence of records, with each record representing a particular set of data unit(s). The records of the manifest may include one or more fields that identify container indexes that index (e.g., include storage information for) the data units. For example, a container index may include one or more fields that specify location information (e.g., containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical chunk is already stored in a container of the deduplication storage system. For example, the deduplication storage system may compare the fingerprint of the received data unit against the fingerprints in one or more container indexes. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry is incremented, and the received data unit is not stored in a container (as it is already present in one of the containers), thereby avoiding storing a duplicate data unit in the deduplication storage system. As used herein, the term "matching operation" may refer to an operation to compare fingerprints of a collection of multiple data units (e.g., from a particular backup data stream) against fingerprints stored in a container index.

In some examples, the deduplication storage system may perform housekeeping jobs or processes to maintain the accuracy of the included metadata. For example, a housekeeping job may be performed to delete a backup item. The housekeeping job may include identifying the manifests included in the backup item, sequentially loading these manifests into memory, and reading the manifests to determine the container identifiers and address information for the data units referenced in each manifest. The housekeeping job may also include loading the container indexes (e.g., using the determined container identifiers) into memory, and using the determined address information to identify the reference counts (in the container indexes) that correspond to the data units referenced in the manifests. Further, the housekeeping job may include, for each of the identified reference counts, decrementing the reference count by one for each manifest that references the data unit (associated with the reference count) and is included in the backup item being deleted. Furthermore, the housekeeping job may include saving the updated container indexes to persistent storage, and deleting the manifests included in the backup item. However, in some examples, the same container indexes may be loaded and saved multiple times during a single housekeeping job (e.g., to process multiple manifests representing different portions of the backup item). Therefore, in such examples, performing the housekeeping job may consume significant amounts of input/output (I/O) bandwidth and system processing time to load and save the same container indexes multiple times.

In accordance with some implementations of the present disclosure, a controller of a deduplication storage system may use a housekeeping work map to accumulate update information for one or more housekeeping jobs (e.g., to delete one or more backup items). Each work entry of the work map may accumulate the estimated number of updates to be performed for a particular container index across multiple manifests. Upon detecting a trigger condition (e.g., the number of work entries in the work map reaches a threshold number), a work entry of the work map may be selected to be processed. The selected work entry may be the work entry indicating the largest estimated number of updates to be performed. The container index corresponding to the selected work entry may be loaded into memory, and the appropriate reference counts may be decremented based on the manifests to be deleted by the pending housekeeping job(s). The selected work entry may then be deleted, and a new work entry may be added to the work map. In this manner, the work map may consolidate the updates to each container index across multiple manifests, and may thereby reduce the I/O cost and improve throughput during housekeeping operations of the deduplication storage system. Various aspects of the housekeeping work map are discussed below with reference to FIGS. 1-8.

FIG. 1—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 and the persistent storage 140 may store various data structures including at least a work map 120, item catalog 125, item metadata 130, manifests 150, container indexes 160, and data containers 170. In some examples, copies of the manifests 150, container indexes 160, and the data containers 170 may be transferred between the memory 115 and persistent storage 140 (e.g., via read and write input/output (I/O) operations).

In some implementations, the storage system 100 may perform deduplication of stored data. For example, the storage controller 110 may receive an inbound data stream 105 (also referred to herein as a "backup item") including multiple data units, and may store at least one copy of each data unit in a data container 170 (e.g., by appending the data units to the end of the data container 170). In some examples, each data container 170 may be divided into entities 175, where each entity 175 includes multiple stored data units.

In one or more implementations, the storage controller 110 may generate a fingerprint for each received data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints in at least one container index. If a match is identified, then the storage controller 110 may determine that a duplicate of the incoming data unit is already stored by the storage system 100. The storage controller 110 may then store references to the previous data unit, instead of storing the duplicate incoming data unit.

In some implementations, the storage controller 110 may generate item metadata 130 to represent each received backup item (e.g., a data stream 105) in a deduplicated form. Each item metadata 130 may include identifiers for a set of manifests 150, and may indicate the sequential order of the set of manifests 150. The manifests 150 record the order in which the data units were received. Further, the manifests 150 may include a pointer or other information indicating the container index 160 that indexes each data unit. In some implementations, the container index 160 may indicate the location in which the data unit is stored. For example, the container index 160 may include information specifying that the data unit is stored at a particular offset in an entity, and that the entity is stored at a particular offset in a data container 170. Further, the container index 160 may include reference counts that indicate the number of manifests 150 that reference each data unit.

In some implementations, the storage controller 110 may receive a read request to access the stored data, and in response may access the item metadata 130 and manifests 150 to determine the sequence of data units that made up the original data. The storage controller 110 may then use pointer data included in a manifest 150 to identify the container indexes 160 that index the data units. Further, the storage controller 110 may use information included in the identified container indexes 160 (and information included in the manifest 150) to determine the locations that store the data units (e.g., data container 170, entity 175, offsets, etc.), and may then read the data units from the determined locations.

In some implementations, the storage controller 110 may use the work map 120 to perform housekeeping jobs of the storage system 100. For example, the storage controller 110 may receive a request to delete a particular backup item, and in response may schedule a housekeeping job to be executed at a later time. Upon initiating the housekeeping job, the storage controller 110 may load the item metadata 130 for the backup item from persistent storage 140 into the memory 115. In some implementations, the storage controller 110 may use the item metadata 130 to identify the manifests 150 that represent the backup item, and to identify the container indexes 160 associated with each identified manifest 150.

In some implementations, the storage controller 110 may populate the work map 120 with work entries corresponding to the identified container indexes 160. Further, each work entry of the work map 120 may include a counter (referred to herein as an "cumulative counter") to accumulate the number of data units that were added to the corresponding container index 160 from manifests 150 in one or more backup items. In some implementations, the value of the cumulative counter may be used to estimate the number of data units to be removed from the container index 160 during the pending housekeeping jobs. Example implementations of the work map 120 and associated data structures are discussed below with reference to FIGS. 4A-4H.

In some implementations, the storage controller 110 may add multiple work entries to the work map 120. Further, upon detecting a trigger event, the storage controller 110 may select a work entry to be processed. For example, the selected work entry may be the work entry with the highest cumulative counter value, which may be predicted to be the container index 160 with the highest number of data units to be removed during the pending housekeeping jobs. After processing the selected work entry (i.e., completing the reference count decrements in the container index associated with the selected work entry), the selected work entry may be deleted from the work map 120. Subsequently, a new work entry may be added to the work map 120.

In some implementations, the trigger event for selecting the work entry may be based on the number of work entries in the work map 120. For example, when the number of work entries in the work map 120 reach a threshold level (e.g., a maximum number of entries, a filled percentage, and so forth), the storage controller 110 may select a work entry to be processed. In other implementations, the trigger event for selecting the work entry may be based on a deduplication ratio of the storage system 100. For example, the storage controller 110 may periodically determine the ratio of the original data stream size to the size of its deduplicated representation (referred to herein as the "deduplication ratio" of the system), and may compare the deduplication ratio to a predefined threshold ratio level. Further, if the deduplication ratio falls below the threshold ratio level (e.g., indicating an insufficient level of deduplication performance), the storage controller 110 may select a work entry to be processed. In some implementations, use of the work map 120 may increase the amount of data that is released for reuse during each housekeeping process, and may thereby improve the deduplication ratio of the storage system 100.

In some implementations, after selecting the work entry to be processed, the container index 160 corresponding to the selected work entry may be loaded from persistent storage 140 into the memory 115. Further, the storage controller 110 may use the container index 160 to identify a set of manifests 150 associated with the container index 160, use the set of manifests 150 to identify the data units to be deleted by the pending housekeeping job(s), and decrement the reference counts for the identified data units in the container index 160. After completion of the reference count decrements, the storage controller 110 may delete the selected entry from the work map 120, and may then add a new entry to the work map 120. In this manner, the storage controller 110 may use the work map 120 to consolidate or aggregate the updates to each container index 160 across multiple manifests 150, and may thereby reduce the I/O cost and improve throughput during the housekeeping jobs of the storage system 100. Example processes for performing housekeeping using the work map 120 are discussed below with reference to FIGS. 3A-3C.

Figure 2:
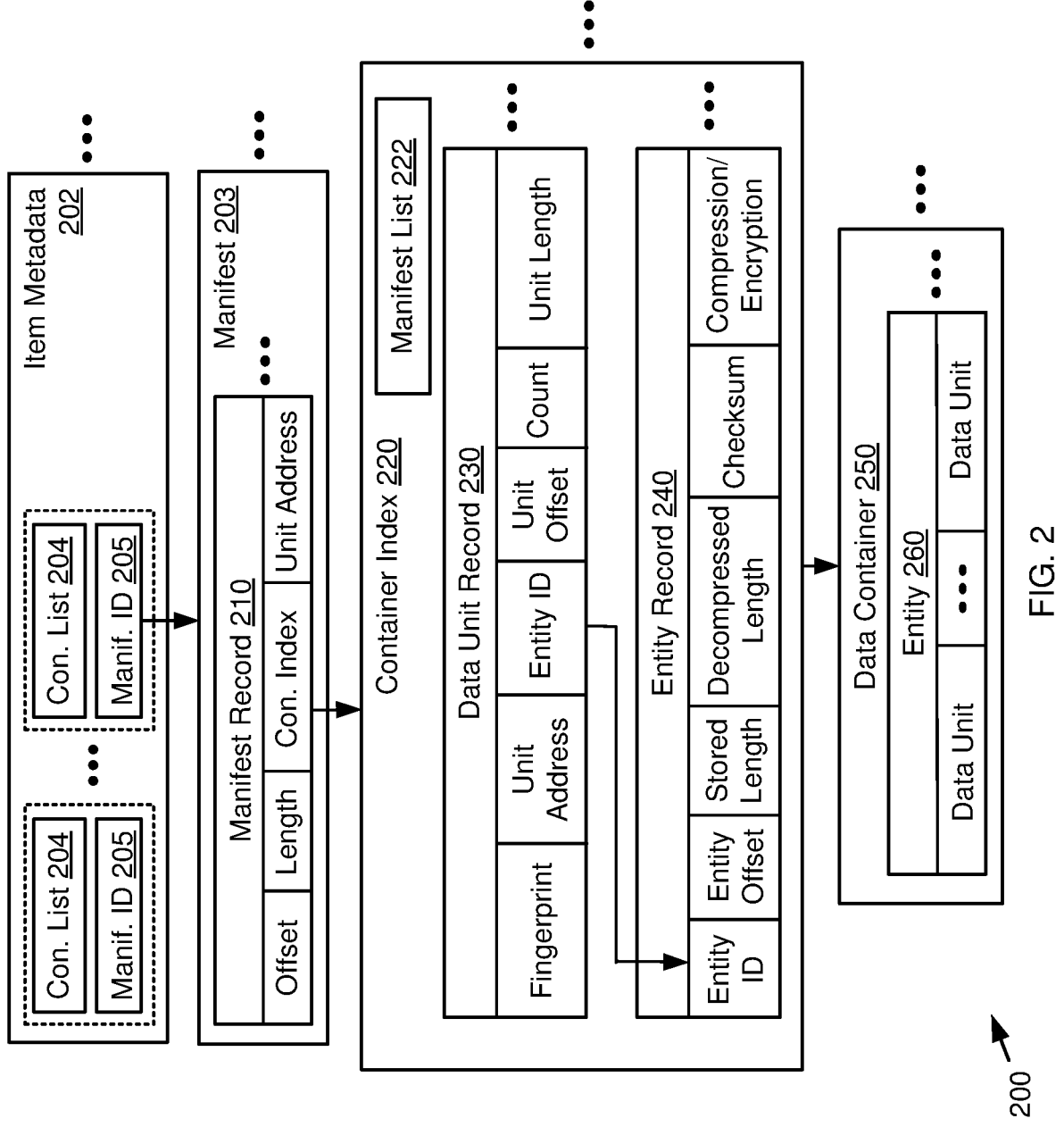
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include item metadata 202, a manifest 203, a container index 220, and a data container 250. In some examples, the item metadata 202, the manifest 203, the container index 220, and the data container 250 may correspond generally to example implementations of item metadata 130, a manifest 150, a container index 160, and a data container 170 (shown in FIG. 1), respectively. In some examples, the data structures 200 may be generated and/or managed by the storage controller 110 (shown in FIG. 1).

In some implementations, the item metadata 202 may include multiple manifests identifiers 205. Each manifests identifier 205 may identify a different manifest 203. In some implementations, the manifests identifiers 205 may be arranged in a stream order (i.e., based on the order of receipt of the data units represented by the identified manifests 203). Further, the item metadata 202 may include a container list 204 associated with each manifest identifier 205. In some implementations, the container list 204 may identify a set of container indexes 220 that index the data units included in the associated manifest 203 (i.e., the manifest 203 identified by the associated manifest identifier 205). Further, in some implementations, the container list 204 may include count information indicating the number of data units that were newly added (i.e., not matched) to each container index 220 from the associated manifest 203 at the time that the identifier of the container index 220 was added to the container list 204. Such count information may be referred to herein as an "ingest count" for a particular combination of a manifest 203 and a container index 220. An example implementation of the container list 204 is described below with reference to FIGS. 4A-4H.

Although one of each is shown for simplicity of illustration in FIG. 2, data structures 200 may include a plurality of instances of item metadata 202, each including or pointing to one or more manifests 203. In such examples, data structures 200 may include a plurality of manifests 203. The manifests 203 may reference a plurality of container indexes 220, each corresponding to one of a plurality of data containers 250. Each container index 220 may comprise one or a plurality of data unit records 230, and one or a plurality of entity records 240.

As shown in FIG. 2, in some examples, each manifest 203 may include one or more manifest records 210. Each manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, and a unit length. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

In some implementations, each container index 220 may include a manifest list 222. The manifest list 222 may be a data structure to identify each manifest 203 that currently references the container index 220. For example, each time that the container index 220 is generated or updated to include information regarding a particular manifest 203, the manifest list 222 in that container index 220 is updated to store an identifier of that manifest 203. Further, when the container index 220 is no longer associated with the manifest 203, the identifier of the manifest 203 may be removed from the manifest list 222. An example implementation of the manifest list 222 is described below with reference to FIG. 4E.

FIGS. 3A-3D and 4A-4H—Example Processes for Housekeeping

Figure 3A:
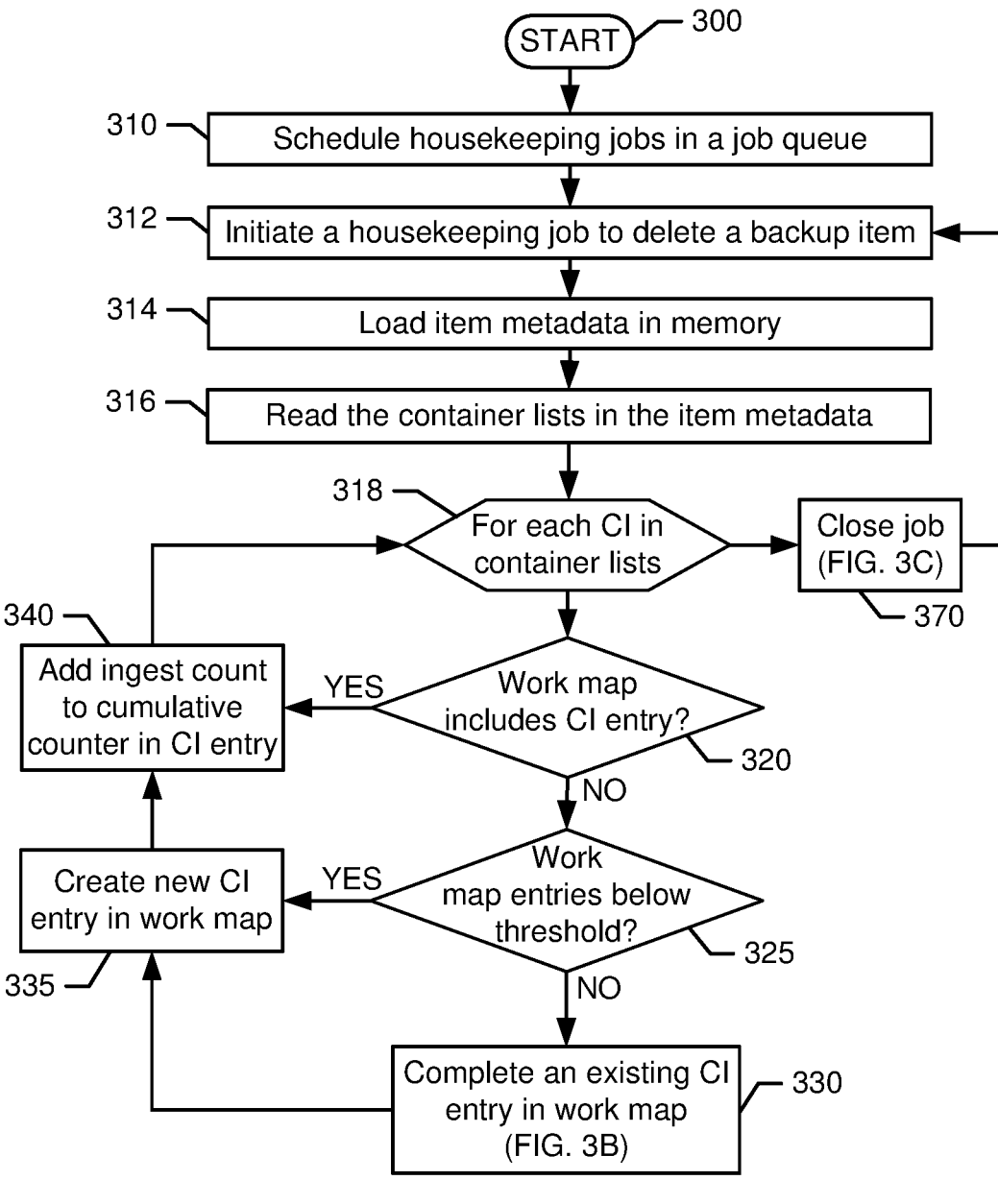

FIG. 3A shows is an example process 300 for housekeeping, in accordance with some implementations. For the sake of illustration, details of the process 300 may be described below with reference to FIGS. 4A-4H, which show example operations in accordance with some implementations. However, other implementations are also possible. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 300 may be executed by a single processing thread. In other implementations, the process 300 may be executed by multiple processing threads in parallel (e.g., concurrently using the work map and executing multiple housekeeping jobs).

Block 310 may include scheduling housekeeping jobs in a job queue. For example, referring to FIG. 4A, the job queue 410 is a data structure to queue requests to delete backup items. Further, the item catalog 450 is a data structure that lists the backup items stored in a deduplication storage system (e.g., storage system 100 shown in FIG. 1) and the current status of each backup item (e.g., active, retired, and so forth). A storage controller (e.g., storage controller 110 shown in FIG. 1) receives multiple deletion requests to delete backup items A-C stored in the storage system 100. In response to the received requests, the storage controller schedules multiple housekeeping jobs in a job queue 410 to delete the backup items A-C. Further, the storage controller updates the item catalog 450 to indicate that backup items A-C have a "retired" status (e.g., are pending deletion in a housekeeping job).

Referring again to FIG. 3A, block 312 may include initiating a housekeeping job to delete a backup item stored in a deduplication storage system. Block 314 may include loading item metadata in memory. For example, referring to FIG. 4A, the storage controller selects a housekeeping job from the job queue 410, and initiates the selected job to delete backup item A. Further, the storage controller loads the item A metadata 420 (i.e., item metadata for backup item A) from the persistent storage 140 to the memory 115.

Referring again to FIG. 3A, block 316 may include reading the container lists included in the item metadata. For example, referring to FIG. 4B, the storage controller reads item A metadata 420 including multiple manifest identifiers 422 and multiple container lists 425, where each container list 425 is associated with a different manifest identifier 422. Each container list 425 includes a different entry (also referred to as a "CI entry") for each container index 160 that indexes data units included in the manifest 150 identified by the associated manifest identifier 422. Further, each container list 425 includes, for each listed container index 160, an ingest count value ("Ingest Count") indicating the number of data units that were newly added (i.e., not matched) to the container index 160 from the manifest 150 at the time that the identifier of the container index 160 was added to the container list 425.

Referring again to FIG. 3A, at block 318, a loop (defined by blocks 318-340) may be entered to process each container index (CI) identified by the container lists in the item metadata. Decision block 320 may include determining whether the work map already includes a work entry associated with the current container index (i.e., the container index being processed in the current loop iteration). If so ("YES"), the process 300 may continue at block 340, including adding the ingest count to the cumulative counter in the work entry. After block 340, the loop may return to block 318 (i.e., to process another container index identified by the container lists in the item metadata). For example, referring to FIG. 4B, the storage controller iterates through the CI entries of each of one or more container lists 425 in the item A metadata 420. The storage controller reads a CI entry for container index C-3, and determines that the work map 430 already includes a work entry for container index C-3. In response, the storage controller adds the ingest count of 8 from the CI entry for C-3 to the cumulative counter in the work entry for C-3, thereby updating the cumulative counter to a new value of 17. Further, the storage controller determines that the work map 430 includes a work entry for C-4, and therefore adds the ingest count of 6 from the CI entry for C-4 to the cumulative counter in the work entry for C-4, thus updating the cumulative counter to a new value of 16.

Referring again to FIG. 3A, if it is determined at decision block 320 that the work map does not include a work entry for the current container index ("NO"), the process 300 may continue at decision block 325, including determining whether the number of work entries in the work map is less than a threshold number. If so ("YES"), the process 300 may continue at block 335, including creating a new work entry in the work map for the current container index. After block 335, the process 300 may continue at block 340, including adding the ingest count to a cumulative counter in the new work entry. For example, referring to FIG. 4C, the storage controller reads a CI entry for container index C-1 in the container lists 425, and determines that the work map 430 does not include a work entry for container index C-1. The storage controller then determines that the number of work entries in the work map 430 is currently less than a predefined threshold number T (e.g., six entries). In response to this determination, the storage controller adds a new work entry for C-1 to the work map 430. Further, the storage controller populates the ingest count of 11 from the CI entry for C-1 to the cumulative counter in the new work entry for C-1.

Referring again to FIG. 3A, if it is determined at decision block 325 that the number of work entries in the work map is not less than the threshold number ("NO"), the process 300 may continue at block 330, including completing an existing work entry in the work map for the current container index. An example expansion of block 330 (i.e., an example process for completing an existing work entry) is described below with reference to FIG. 3B.

Figure 4A:
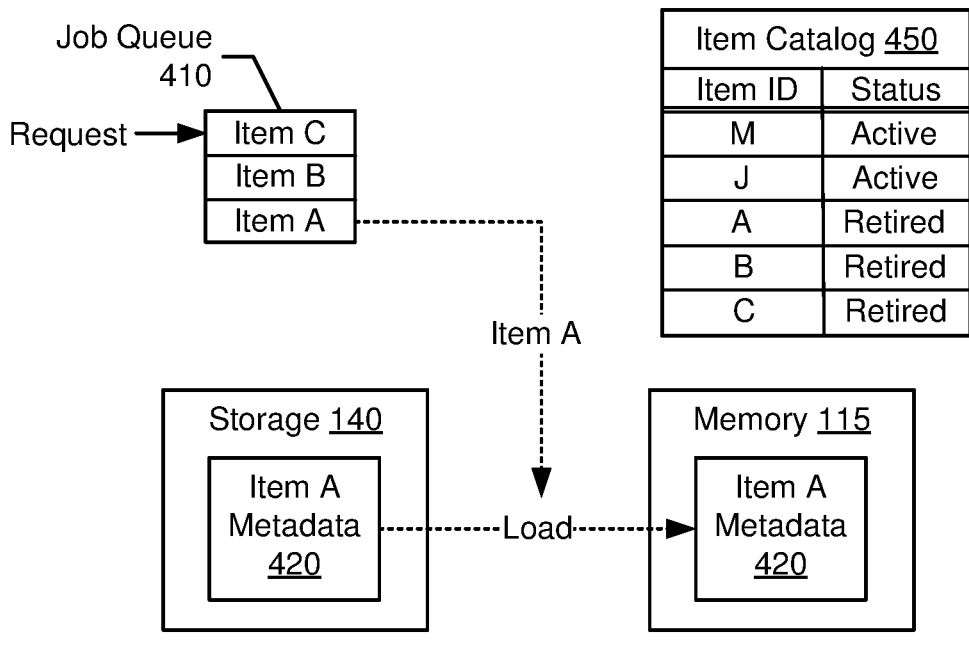
FIGS. 4A-4H are illustrations of example operations, in accordance with some implementations.
Figure 4B:
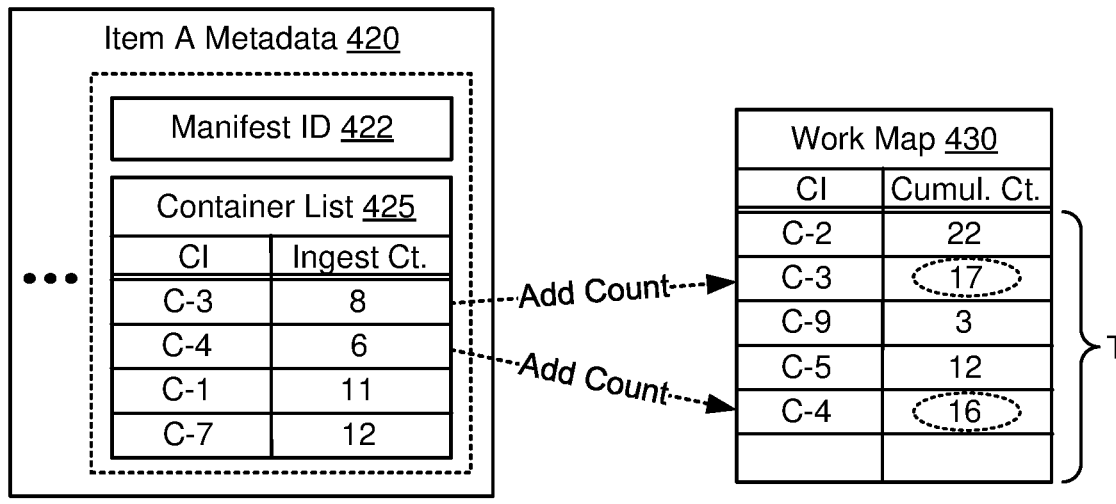
Figure 4C:
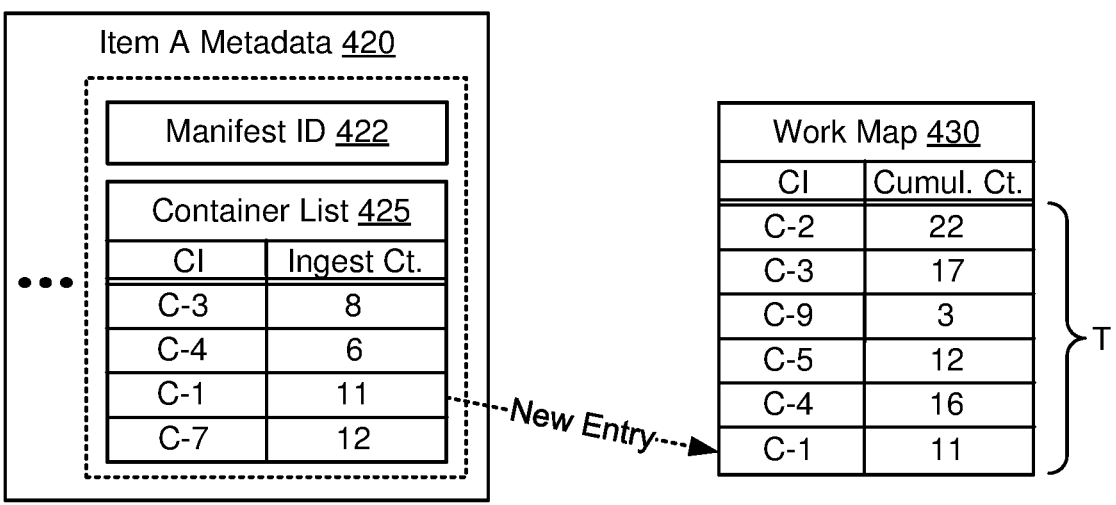
Figure 4D:
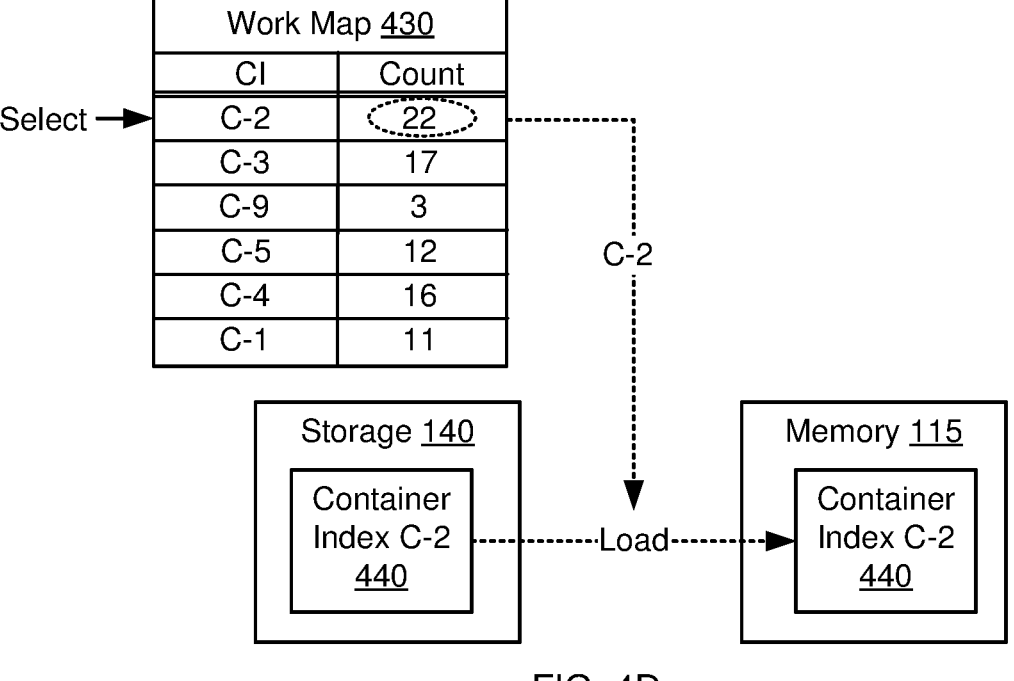
Figure 4E:
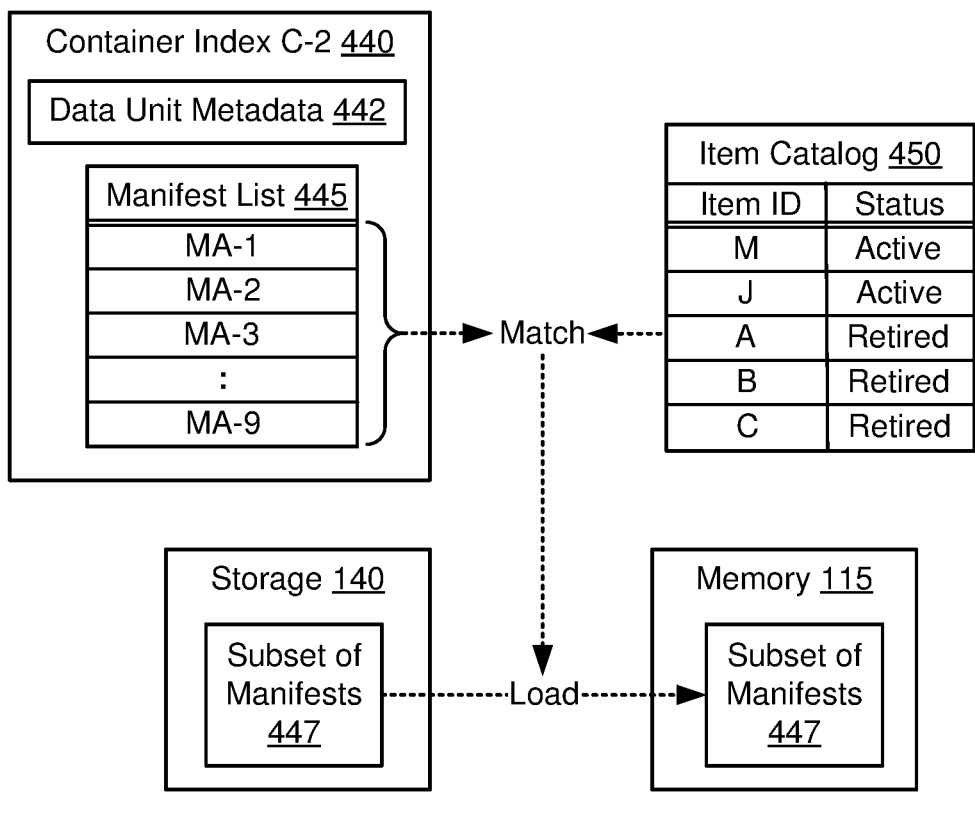
Figure 4F:
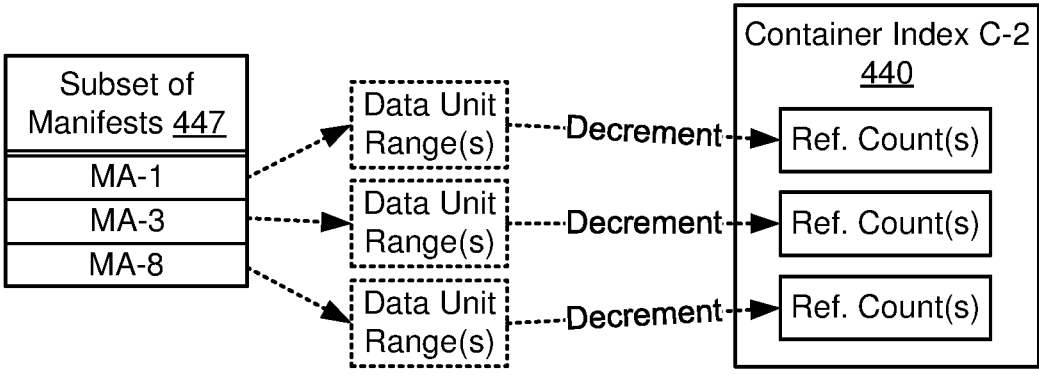
Figure 4G:
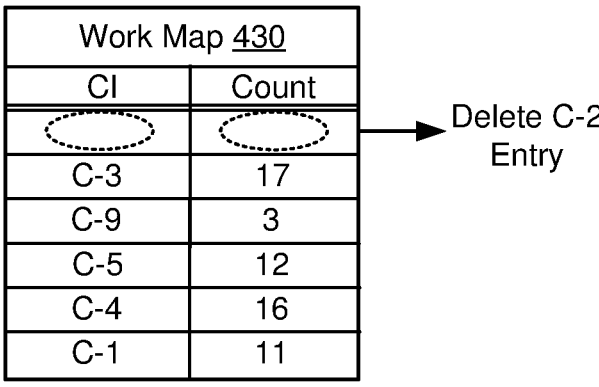
Figure 4H:
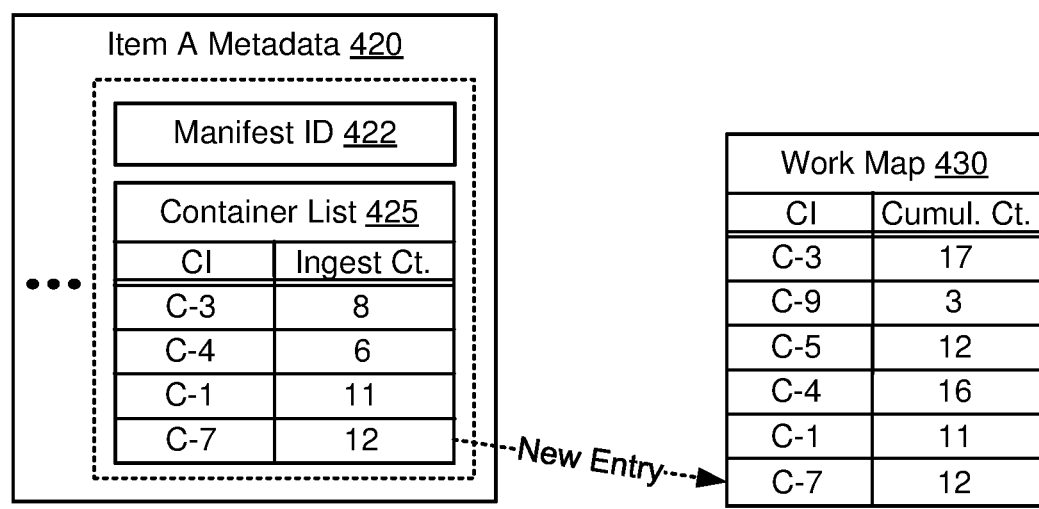

After block 330, the process 300 may continue at block 335, including creating a new work entry in the work map for the current container index. Further, after block 335, the process 300 may continue at block 340, including adding the ingest count to a cumulative counter in the new work entry. For example, referring to FIG. 4C, the storage controller reads a CI entry for container index C-7 in the container lists 425, and determines that the work map 430 does not include a work entry for container index C-7. The storage controller then determines that the number of work entries in the work map 430 is not currently less than the threshold number T. In response, as shown in FIG. 4G, the storage controller completes and clears the existing work entry for C-2, thereby reducing the number of entries in the work map 430 by one. Further, as shown in FIG. 4H adds a new work entry for C-7 to the work map 430, and populates the ingest count of 12 from the CI entry for C-7 in the cumulative counter in the new work entry for C-7.

Referring again to FIG. 3A, after block 340, the loop may return to block 318 (i.e., to process another container index identified by the container lists in the item metadata). After all of the container indexes have been processed at block 318, the process 300 may continue at block 370, including closing the current housekeeping job. An example expansion of block 370 (i.e., an example process for closing a housekeeping job) is described below with reference to FIG. 3C.

FIG. 3B shows is an example process 330 for completing an existing work entry, in accordance with some implementations. The process 330 may illustrate an example expansion of block 330 (shown in FIG. 3A). Accordingly, in some implementations, the process 330 may be performed after a determination that a work map does not include a work entry for the current container index (at decision block 320 in FIG. 3A), and after a determination that the number of work entries in the work map is not less than a threshold number (at decision block 325 in FIG. 3A).

For the sake of illustration, details of the process 330 may be described below with reference to FIGS. 1 and 4A-4H. However, other implementations are also possible. In some examples, the process 330 may be performed using the storage controller 110 (shown in FIG. 1). The process 330 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 330 may be executed by a single processing thread. In other implementations, the process 330 may be executed by multiple processing threads in parallel.

Block 342 may include selecting an existing work entry in the work map. Block 344 may include loading the container index for the existing work entry into memory. For example, referring to FIG. 4D, the storage controller determines that the number of work entries in the work map 430 is equal to the threshold number T. In response to this determination, the storage controller 110 selects the existing work entry that includes the highest cumulative counter, namely the work entry for container index C-2. The storage controller then causes the container index C-2 440 to be loaded from the persistent storage 140 into the memory 115.

Referring again to FIG. 3B, block 346 may include reading the manifest list in the container index to identify a set of manifests. Block 348 may include determining a subset of manifests to be deleted from the deduplication storage system. Block 350 may include loading the subset of manifests into memory. For example, referring to FIG. 4E, the container index C-2 440 includes data unit metadata 442 and a manifest list 445. The data unit metadata 442 includes storage information for data units (e.g., container location, reference count, and the like). The manifest list 445 is a data structure that lists each manifest (e.g., MA-1) that currently references the container index C-2 400. Further, the item catalog 450 is a data structure that lists the backup items stored in a deduplication storage system (e.g., storage system 100 shown in FIG. 1) and the current status of each backup item. The storage controller determines a subset of manifests in the manifest list 445 that match the backup items with retired status (e.g., items A-C). For example, a portion of each manifest identifier may be the item identifier of the backup item that includes that manifest. Accordingly, a manifest may be matched to the backup item having a retired status and an item identifier that is also included in the manifest identifier. The storage controller causes the subset of manifests 447 (i.e., the manifests in the manifest list 445 that match the backup items with retired status) to be loaded from the persistent storage 140 into the memory 115.

Referring again to FIG. 3B, block 352 may include identifying, using the subset of manifests loaded in memory, a set of data units indexed in the container index. Block 354 may include decrementing the reference counts for the set of data units indexed in the container index. For example, referring to FIG. 4F, the storage controller reads the subset of manifests 447 and identifies one or more data unit ranges to be decremented. For example, a data unit range may be specified a first data unit location and a run length (i.e., the number of data units consecutively following the first data unit). Further, the storage controller decrements the reference counts for the identified data unit ranges in the container index C-2 400.

Referring again to FIG. 3B, block 356 may include compacting and releasing unused data. Block 358 may include saving the container index to the persistent storage. Block 360 may include deleting the existing work entry in the work map. After block 360, the process 330 may be completed. For example, referring to FIG. 4G, the storage controller compacts and releases portions of metadata that are no longer required (e.g., in containers indexes 160, data containers 170, and so forth). Further, the storage controller clears the work entry for container index C-2 in the work map 430, thereby indicating that the pending housekeeping updates for container index C-2 are completed. Accordingly, the number of entries in the work map 430 is reduced below the threshold number T, and a new work entry may be added to the work map 430 (e.g., the new work entry for container index C-7, as shown in FIG. 4H).

Figure 3C:
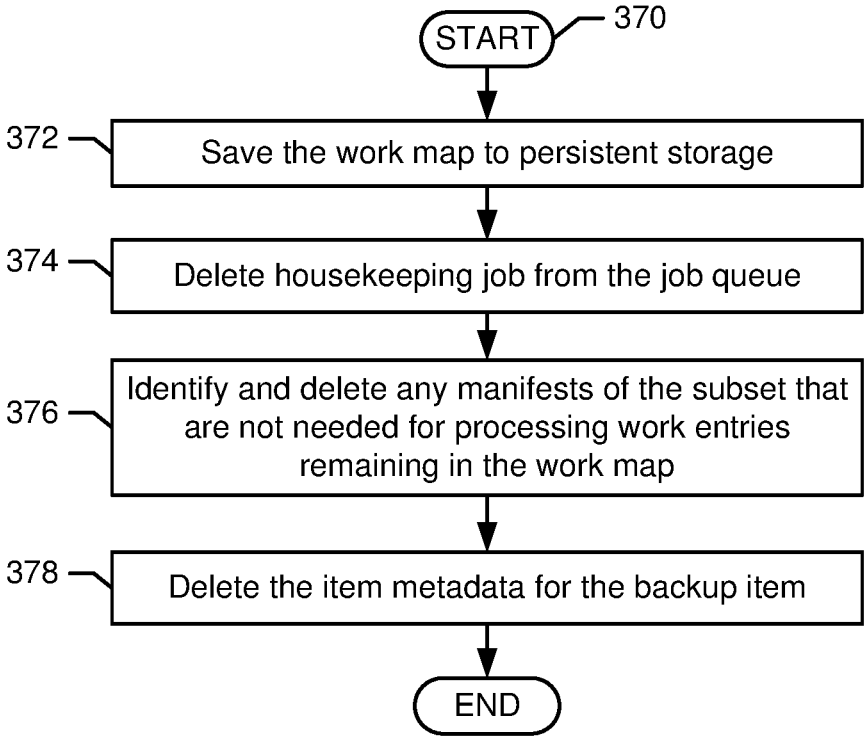

FIG. 3C shows is an example process 370 for closing a housekeeping job, in accordance with some implementations. The process 370 may illustrate an example expansion of block 370 (shown in FIG. 3A). Accordingly, in some implementations, the process 370 may be performed after all container indexes in the container lists of the item metadata have been processed (at block 318 in FIG. 3A).

For the sake of illustration, details of the process 370 may be described below with reference to FIGS. 1 and 4A-4H. However, other implementations are also possible. In some examples, the process 370 may be performed using the storage controller 110 (shown in FIG. 1). The process 370 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 370 may be executed by a single processing thread. In other implementations, the process 370 may be executed by multiple processing threads in parallel.

Block 372 may include saving the work map to persistent storage. Block 374 may include deleting the housekeeping job from the job queue. For example, referring to FIG. 1, the storage controller 110 saves the work map 120 from the memory 115 to the persistent storage 140. Further, the storage controller 110 deletes the housekeeping job for backup item A from the job queue (e.g., job queue 410 shown in FIG. 4A).

Referring again to FIG. 3C, block 376 may include identifying and deleting any manifests of the subset of manifests that are not needed for processing work entries remaining in the work map. Block 378 may include deleting the item metadata for the backup item. After block 378, the process 370 may be completed. For example, referring to FIGS. 4A-4E, the subset of manifests 447 (e.g., determined at block 348 shown in FIG. 3B) includes the manifests listed in the manifest list 445 that match the backup items with retired status. After completing the housekeeping job for backup item A, the storage controller identifies and deletes any of the subset of manifests 447 are not needed to process the remaining work entries in the work map 430. For example, the storage controller may read the container list 425 (in item A metadata 420) for each manifest of the subset of manifests 447, and may determine whether any of the listed container indexes corresponds to a work entry that remains in the work map 430 (e.g., a work entry that is pending to be processed). If a particular container list 425 does not list any container index that corresponds to a remaining work entry, the storage controller 110 deletes the manifest associated with the particular container list 425. Further, the storage controller deletes the item A metadata 420.

Figure 3D:
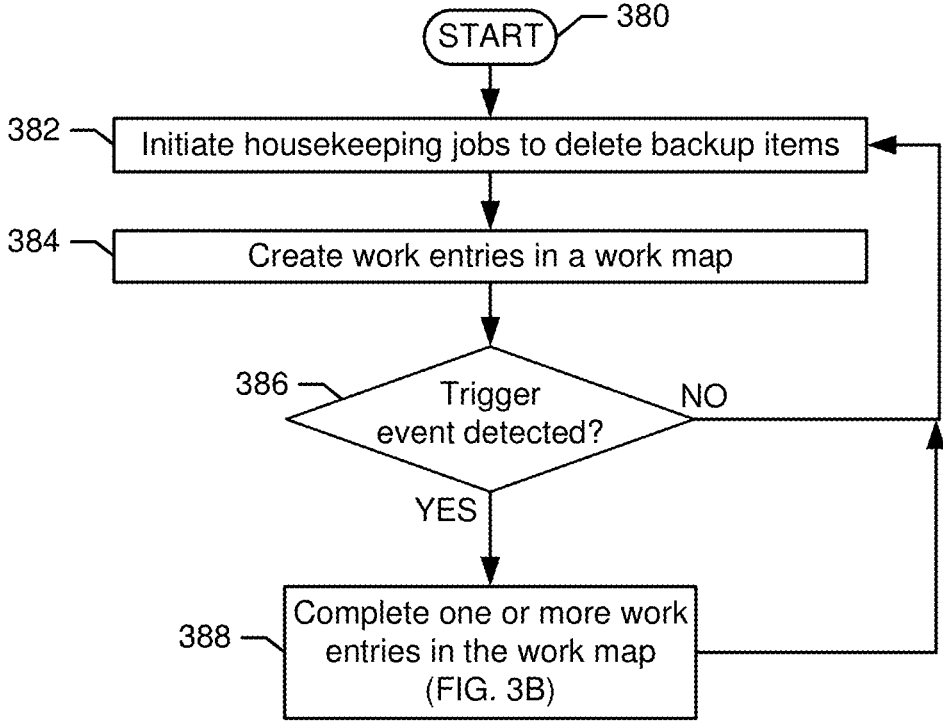

FIG. 3D shows is an example process 380 for housekeeping, in accordance with some implementations. For the sake of illustration, details of the process 380 may be described below with reference to FIGS. 4A-4H, which show example operations in accordance with some implementations. However, other implementations are also possible. In some examples, the process 380 may be performed using the storage controller 110 (shown in FIG. 1). The process 380 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 380 may be executed by a single processing thread. In other implementations, the process 380 may be executed by multiple processing threads in parallel (e.g., concurrently using the work map and executing multiple housekeeping jobs).

Block 382 may include initiating housekeeping jobs to delete backup items stored in a deduplication storage system. Block 384 may include creating work entries in a work map. Decision block 386 may include determining whether a trigger event has been detected. If not ("NO"), the process 380 may return to block 382 (e.g., to continue initiating housekeeping jobs). Otherwise, if it is determined at decision block 386 that a trigger event has been detected ("YES"), the process 380 may continue at block 388, completing one or more work entries in the work map. An example expansion of block 388 (i.e., an example process for completing an existing work entry) is described above with reference to FIG. 3B. After block 388, the process 380 may be completed.

In some implementations, the trigger event (detected at decision block 386) may occur when the number of work entries in the work map reach a threshold level (e.g., a maximum number of entries, a filled percentage, and so forth). In other implementations, the trigger event may occur when a deduplication ratio of the storage system falls below a threshold ratio level. It is contemplated that other trigger events may be used in the process 380 (e.g., commands, program events, system metrics, and so forth).

FIG. 5—Example Process for Generating Metadata

FIG. 5 shows is an example process 500 for generating metadata, in accordance with some implementations. For the sake of illustration, details of the process 500 may be described below with reference to FIGS. 1 and 4A-4H, which show examples in accordance with some implementations. However, other implementations are also possible. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 510 may include receiving a backup item to be stored in a persistent storage of a deduplication storage system. Block 520 may include generating fingerprints for the data units of the received backup item. For example, referring to FIG. 1, the storage controller 110 receives a backup item (e.g., data stream 105) to be stored in the deduplication storage system 100, and generates fingerprints for the data units in the received backup item.

Referring again to FIG. 5, block 530 may include matching the generated fingerprints against fingerprints stored in container indexes of the deduplication storage system. Block 540 may include identifying a subset of the generated fingerprints that do not match the fingerprints stored in the container indexes. Block 550 may include storing the identified subset of the generated fingerprints in a set of container indexes. For example, referring to FIG. 1, the storage controller 110 compares the generated fingerprints to the fingerprints included in container indexes 160. If a match is identified for a data unit, then the storage controller 110 determines that a duplicate of the data unit is already stored by the storage system 100. In response to this determination, the storage controller 110 stores a reference to the previous data unit (e.g., in a manifest 150) in deduplicated form. Otherwise, if a match is not identified for a data unit, then the storage controller 110 stores the data unit is a data container 170, and adds an entry for the data unit to a container index 160 corresponding to that data container 170.

Referring again to FIG. 5, block 560 may include generating a set of manifests to record the order of the data units of the received backup item. Block 570 may include storing, in each container index, a manifest list to record the manifests that reference the container index. For example, referring to FIG. 4E, the storage controller records the order in which data units are received in one or more manifests 150. Further, the storage controller generates the manifest list 445 in the container index C-2 440. The manifest list 445 records each manifest (e.g., MA-1) that currently references the container index C-2 400. The storage controller may continually update the manifest list 445 during operation (e.g., to reflect deletions or additions of manifests to the manifest list 445 during changes to the data stored in storage system 100).

Referring again to FIG. 5, block 580 may include generating an item metadata to record identifiers of the set of manifests. For example, referring to FIG. 1, the storage controller 110 generates item metadata 130 to represent the backup item. The item metadata 130 may include identifiers for a set of manifests 150.

Referring again to FIG. 5, block 590 may include storing at least one container list in the item metadata to record the set of container indexes and the ingest counts of the set of container indexes. After block 590, the process 500 may be completed. For example, referring to FIG. 4B, the storage controller may generate the item A metadata 420 including multiple manifest identifiers 422 and multiple container lists 425, where each container list 425 is associated with a different manifest identifier 422. Each container list 425 includes a different entry for each container index 160 that indexes data units included in the manifest 150 identified by the associated manifest identifier 422. Further, each container list 425 includes, for each listed container index 160, an ingest count value indicating the number of data units that were newly added (i.e., not matched) to the container index 160 from the manifest 150 at the time that the identifier of the container index 160 was added to the container list 425.

FIG. 6—Example Computing Device

FIG. 6 shows a schematic diagram of an example computing device 600. In some examples, the computing device 600 may correspond generally to some or all of the storage system 100 (shown in FIG. 1). As shown, the computing device 600 may include a hardware processor 602, a memory 604, and machine-readable storage 605 including instructions 610-650. The machine-readable storage 605 may be a non-transitory medium. The instructions 610-650 may be executed by the hardware processor 602, or by a processing engine included in hardware processor 602.

Instruction 610 may be executed to initiate a housekeeping job to delete a backup item stored in a deduplication storage system. For example, referring to FIGS. 1 and 4A, the storage controller 110 selects a housekeeping job from the job queue 410, and initiates the selected job to delete backup item A.

Instruction 620 may be executed to identify a set of container indexes affected by the housekeeping job, the set of container indexes comprising at least a first container index. For example, referring to FIG. 4A, the storage controller loads the item A metadata 420 from the persistent storage 140 to the memory 115. The storage controller reads the container lists 425 (included in the item A metadata 420) to identify the container indexes 160 that index the data units included in the backup item A.

Instruction 630 may be executed to determine whether a housekeeping work map includes a first work entry associated with the first container index. For example, referring to FIG. 4B, the storage controller iterates through the set of container indexes listed in the container lists 425 of the item A metadata 420. Further, the storage controller determines whether the work map 430 includes a work entry for each container index listed in the container lists 425.

Instruction 640 may be executed to, in response to a determination that the housekeeping work map includes the first work entry associated with the first container index, determine an ingest count of new data units added to a first container during an ingest of the backup item into the deduplication storage system, the first container associated with the first container index. Instruction 650 may be executed to add the determined ingest count to a cumulative counter included in the first work entry associated with the first container index. After block 650, the process 600 may be completed. For example, referring to FIG. 4B, the storage controller 110 determines that the work map 430 already includes a work entry for a container index C-3 listed in a container list 425. In response to this determination, the storage controller 110 reads the ingest count value of 8 stored in the CI entry for container index C-3 in the container list 425. Further, the storage controller 110 adds the ingest count of 8 from the CI entry to the cumulative counter in the work entry for container index C-3 in the work map 430, thereby updating the cumulative counter to a new value of 17.

FIG. 7—Example Process for Housekeeping

FIG. 7 shows is an example process 700 for housekeeping, in accordance with some implementations. In some examples, the process 700 may be performed using the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 710 may include initiating, by a storage controller of a deduplication storage system, a housekeeping job to delete a backup item stored in the deduplication storage system. Block 720 may include identifying, by the storage controller, a set of container indexes affected by the housekeeping job, the set of container indexes comprising at least a first container index. Block 730 may include determining, by the storage controller, whether a housekeeping work map includes a first work entry associated with the first container index.

Block 740 may include, in response to a determination that the housekeeping work map includes the first work entry associated with the first container index, determining, by the storage controller, an ingest count of new data units added to a first container during an ingest of the backup item into the deduplication storage system, the first container associated with the first container index. Block 750 may include adding, by the storage controller, the determined ingest count to a cumulative counter included in the first work entry associated with the first container index.

FIG. 8—Example Machine-Readable Medium

FIG. 8 shows a machine-readable medium 800 storing instructions 810-850, in accordance with some implementations. The instructions 810-850 can be executed by a single processor, multiple processors, a single processing engine, multiple processing engines, and so forth. The machine-readable medium 800 may be a non-transitory storage medium, such as an optical, semiconductor, or magnetic storage medium.

Instruction 810 may be executed to initiate a housekeeping job to delete a backup item stored in a deduplication storage system. Instruction 820 may be executed to identify a set of container indexes affected by the housekeeping job, the set of container indexes comprising at least a first container index. Instruction 830 may be executed to determine whether a housekeeping work map includes a first work entry associated with the first container index.

Instruction 840 may be executed to, in response to a determination that the housekeeping work map includes the first work entry associated with the first container index, determine an ingest count of new data units added to a first container during an ingest of the backup item into the deduplication storage system, the first container associated with the first container index. Instruction 850 may be executed to add the determined ingest count to a cumulative counter included in the first work entry associated with the first container index.

In accordance with some implementations of the present disclosure, a controller of a deduplication storage system may use a housekeeping work map to accumulate update information for one or more housekeeping jobs. Each work entry of the work map may accumulate the estimated number of updates to be performed for a particular container index across multiple manifests. Upon detecting a trigger condition, a work entry of the work map may be selected to be processed. The selected work entry may be the work entry with indicating the largest estimated number of updates to be performed. The container index corresponding to the selected work entry may be loaded into memory, and the appropriate reference counts may be decremented based on the manifests to be deleted by the pending housekeeping job(s). The selected work entry may then be deleted, and a new work entry may be added to the work map. In this manner, the work map may consolidate the updates to each container index across multiple manifests, and may thereby reduce the I/O cost and improve throughput during housekeeping operations of the deduplication storage system.

Note that, while FIGS. 1-8 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
   a processor;
   a memory; and
   a machine-readable storage storing instructions, the instructions executable by the processor to:
      initiate a housekeeping job to delete item metadata for a backup item stored in a deduplication storage system;

identify a set of container indexes affected by the housekeeping job, the set of container indexes comprising at least a first container index, wherein each of the set of container indexes includes storage metadata for data units stored in the deduplication storage system;

read a housekeeping work map that includes a first work entry, wherein the housekeeping work map is a data structure comprising a plurality of work entries that each include a different container index identifier and a different cumulative counter, wherein the container index identifier in each work entry identifies a different container that has pending housekeeping updates across one or more manifests, and wherein the cumulative counter in each work entry indicates an estimated number of the pending housekeeping updates for the different container index that is identified by the container index identifier in that work entry;

in response to a determination that the first work entry of the housekeeping work map includes a first container index identifier that identifies the first container index, determine an ingest count of new data units added to a first container during an ingest of the backup item into the deduplication storage system, the first container associated with the first container index;

perform a first update to the housekeeping work map by adding the determined ingest count to a first cumulative counter included in the first work entry including the first container index identifier, wherein the first update is one of a set of updates to the housekeeping work map; and after completion of the set of updates to the housekeeping work map, delete the item metadata for the backup item from the persistent storage.

2. The computing device of claim 1, including instructions executable by the processor to, prior to the completion of the set of updates to the housekeeping work map:

load the item metadata for the backup item from a persistent storage into the memory, the item metadata comprising at least one manifest identifier and at least one container list;

identify, based on the at least one container list in the item metadata, the set of container indexes affected by the housekeeping job; and for each container index in the set of container indexes:

determine, based on the at least one container list in the item metadata, the ingest count of new data units added to the container associated with the container index.

3. The computing device of claim 1, including instructions executable by the processor to:

determine whether the housekeeping work map includes a second work entry associated with a second container index, wherein the second container index is included in the set of container indexes affected by the housekeeping job;

in response to a determination that the housekeeping work map does not include the second work entry associated with the second container index, determine whether the housekeeping work map includes less than a threshold number of work entries;

in response to a determination that the housekeeping work map includes less than the threshold number of work entries:

create the second work entry associated with the second container index in the housekeeping work map; and populate a second cumulative counter included in the second work entry with the ingest count of new data units added to the second container during the ingest of the backup item into the deduplication storage system.

4. The computing device of claim 3, including instructions executable by the processor to:

in response to a determination that the housekeeping work map does not include less than the threshold number of work entries, select, in the housekeeping work map, an existing work entry based on a third cumulative counter included in the existing work entry, wherein the existing work entry is associated with a third container index; and in response to a selection of the existing work entry, load the third container index from a persistent storage into the memory and modify a set of reference counts in the third container index.

5. The computing device of claim 4, including instructions executable by the processor to:

read a manifest list in the third container index to identify a plurality of manifests;

determine, from the plurality of manifests, a subset of manifests to be deleted from the deduplication storage system;

load the subset of manifests from the persistent storage into the memory;

identify, using the subset of manifests loaded in the memory, a set of data units associated with the third container index; and decrement reference counts for the set of data units in the third container index.

6. The computing device of claim 5, including instructions executable by the processor to:

after completion of decrements of the reference counts for the set of data units in the third container index:

compact and release unused data;

save the third container index to the persistent storage; and delete the existing work entry in the work map.

7. The computing device of claim 5, including instructions executable by the processor to:

perform the set of updates to the housekeeping work map based on each of the set of container indexes;

after the completion of the set of updates to the housekeeping work map:

save the work map to the persistent storage;

delete the housekeeping job from a job queue; and delete, from the persistent storage, any manifests of the subset of manifests that are not needed for housekeeping jobs remaining in the job queue.

8. The computing device of claim 4, including instructions executable by the processor to:

after modification of the set of reference counts in the third container index, delete the existing work entry from the housekeeping work map;

after deletion of the existing work entry from the housekeeping work map, create the second work entry associated with the second container index in the housekeeping work map; and update the second cumulative counter included in the second work entry to indicate the ingest count of new data units added to the second container during the ingest of the backup item into the deduplication storage system.

9. A method comprising:

initiating, by a storage controller of a deduplication storage system, a housekeeping job to delete item metadata for a backup item stored in the deduplication storage system;

identifying, by the storage controller, a set of container indexes affected by the housekeeping job, the set of container indexes comprising at least a first container index;

determining, by the storage controller, whether a housekeeping work map includes a first work entry associated with the first container index, wherein the housekeeping work map is a data structure comprising a plurality of work entries, wherein each work entry in the housekeeping work map is associated with a different container index that has pending housekeeping updates across one or more manifests, and wherein each work entry includes a cumulative counter to indicate an estimated number of the pending housekeeping updates for the different container index associated with that work entry;

in response to a determination that the housekeeping work map includes the first work entry associated with the first container index, determining, by the storage controller, an ingest count of new data units added to a first container during an ingest of the backup item into the deduplication storage system, the first container associated with the first container index;

adding performing, by the storage controller, a first update to the housekeeping work map by adding the determined ingest count to a first cumulative counter included in the first work entry associated with the first container index, wherein the first update is one of a set of updates to the housekeeping work map; and after completing the set of updates to the housekeeping work map, deleting, by the storage controller, the item metadata for the backup item from the persistent storage.

10. The method of claim 9, comprising, prior to completing the set of updates to the housekeeping work map:

loading the item metadata for the backup item from a persistent storage into the memory, the item metadata comprising at least one manifest identifier and at least one container list;

identifying, based on the at least one container list in the item metadata, the set of container indexes affected by the housekeeping job; and for each container index in the set of container indexes:

determining, based on the at least one container list in the item metadata, the ingest count of new data units added to the container associated with the container index.

11. The method of claim 9, comprising:

determining whether the housekeeping work map includes a second work entry associated with a second container index, wherein the second container index is included in the set of container indexes affected by the housekeeping job;

in response to a determination that the housekeeping work map does not include the second work entry associated with the second container index, determining whether the housekeeping work map includes less than a threshold number of work entries;

in response to a determination that the housekeeping work map includes less than the threshold number of work entries:

creating the second work entry associated with the second container index in the housekeeping work map; and populating a second cumulative counter included in the second work entry with the ingest count of new data units added to the second container during the ingest of the backup item into the deduplication storage system.

12. The method of claim 11, comprising:

in response to a determination that the housekeeping work map does not include less than the threshold number of work entries, selecting, in the housekeeping work map, an existing work entry based on a third cumulative counter included in the existing work entry, wherein the existing work entry is associated with a third container index; and in response to a selection of the existing work entry, loading the third container index from a persistent storage into the memory and modifying a set of reference counts in the third container index.

13. The method of claim 12, comprising:

reading a manifest list in the third container index to identify a plurality of manifests;

determining, from the plurality of manifests, a subset of manifests to be deleted from the deduplication storage system;

loading the subset of manifests from the persistent storage into the memory;

identifying, using the subset of manifests loaded in the memory, a set of data units associated with the third container index; and decrementing reference counts for the set of data units in the third container index.

14. The method of claim 12, comprising:

after modifying the set of reference counts in the third container index, deleting the existing work entry from the housekeeping work map;

after deleting the existing work entry from the housekeeping work map, creating the second work entry associated with the second container index in the housekeeping work map; and updating the second cumulative counter included in the second work entry to indicate the ingest count of new data units added to the second container during the ingest of the backup item into the deduplication storage system.

15. A non-transitory machine-readable medium storing instructions that upon execution cause a processor to:

initiate a housekeeping job to delete item metadata for a backup item stored in a deduplication storage system;

identify a set of container indexes affected by the housekeeping job, the set of container indexes comprising at least a first container index;

determine whether a housekeeping work map includes a first work entry associated with the first container index, wherein the housekeeping work map is a data structure comprising a plurality of work entries, wherein each work entry in the housekeeping work map is associated with a different container index that has pending housekeeping updates across one or more manifests, and wherein each work entry includes a cumulative counter to indicate an estimated number of the pending housekeeping updates for the different container index associated with that work entry;

in response to a determination that the housekeeping work map includes the first work entry associated with the first container index, determine an ingest count of new data units added to a first container during an ingest of the backup item into the deduplication storage system, the first container associated with the first container index;

perform a first update to the housekeeping work map by adding the determined ingest count to a first cumulative counter included in the first work entry associated with the first container index, wherein the first update is one of a set of updates to the housekeeping work map; and after completion of the set of updates to the housekeeping work map, delete the item metadata for the backup item from the persistent storage.

16. The non-transitory machine-readable medium of claim 15, including instructions that upon execution cause the processor to, prior to the completion of the set of updates to the housekeeping work map:

load the item metadata for the backup item from a persistent storage into a memory, the item metadata comprising at least one manifest identifier and at least one container list;

identify, based on the at least one container list in the item metadata, the set of container indexes affected by the housekeeping job; and for each container index in the set of container indexes:

determine, based on the at least one container list in the item metadata, the ingest count of new data units added to the container associated with the container index.

17. The non-transitory machine-readable medium of claim 15, including instructions that upon execution cause the processor to:

determine whether the housekeeping work map includes a second work entry associated with a second container index, wherein the second container index is included in the set of container indexes affected by the housekeeping job;

in response to a determination that the housekeeping work map does not include the second work entry associated with the second container index, determine whether the housekeeping work map includes less than a threshold number of work entries;

in response to a determination that the housekeeping work map includes less than the threshold number of work entries:

create the second work entry associated second the first container index in the housekeeping work map; and populate a second cumulative counter included in the second work entry with the ingest count of new data units added to the second container during the ingest of the backup item into the deduplication storage system.

18. The non-transitory machine-readable medium of claim 17, including instructions that upon execution cause the processor to:

in response to a determination that the housekeeping work map does not include less than the threshold number of work entries, select, in the housekeeping work map, an existing work entry based on a third cumulative counter included in the existing work entry, wherein the existing work entry is associated with a third container index; and in response to a selection of the existing work entry, load the third container index from a persistent storage into a memory and modify a set of reference counts in the third container index.

19. The non-transitory machine-readable medium of claim 18, including instructions that upon execution cause the processor to:

read a manifest list in the third container index to identify a plurality of manifests;

determine, from the plurality of manifests, a subset of manifests to be deleted from the deduplication storage system;

load the subset of manifests from the persistent storage into the memory;

identify, using the subset of manifests loaded in the memory, a set of data units associated with the third container index; and decrement reference counts for the set of data units in the third container index.

20. The non-transitory machine-readable medium of claim 18, including instructions that upon execution cause the processor to:

after modification of the set of reference counts in the third container index, delete the existing work entry from the housekeeping work map;

after deletion of the existing work entry from the housekeeping work map, create the second work entry associated with the second container index in the housekeeping work map; and update the second cumulative counter included in the second work entry to indicate the ingest count of new data units added to the second container during the ingest of the backup item into the deduplication storage system.

* * * * *